United States Patent
Qin

(10) Patent No.: US 11,991,231 B2
(45) Date of Patent: May 21, 2024

(54) METHOD FOR PLAYING STREAMING MEDIA FILE AND DISPLAY APPARATUS

(71) Applicant: QINGDAO HISENSE MEDIA NETWORKS LTD., Shandong (CN)

(72) Inventor: Jingbo Qin, Shandong (CN)

(73) Assignee: QINGDAO HISENSE MEDIA NETWORKS LTD., Shandong (CN)

(*) Notice: Subject to any disclaimer, the term of this patent is extended or adjusted under 35 U.S.C. 154(b) by 23 days.

(21) Appl. No.: 17/808,474

(22) Filed: Jun. 23, 2022

(65) Prior Publication Data

US 2022/0329645 A1 Oct. 13, 2022

Related U.S. Application Data

(63) Continuation of application No. PCT/CN2020/101157, filed on Jul. 9, 2020.

(30) Foreign Application Priority Data

May 19, 2020 (CN) .......................... 202010424713.6

(51) Int. Cl.
*H04L 65/612* (2022.01)
*G06F 21/57* (2013.01)
(Continued)

(52) U.S. Cl.
CPC ............ *H04L 65/612* (2022.05); *G06F 21/57* (2013.01); *H04L 65/65* (2022.05);
(Continued)

(58) Field of Classification Search
CPC ....... H04L 65/612; H04L 65/65; G06F 21/57; H04N 21/4405; H04N 21/4627;
(Continued)

(56) References Cited

U.S. PATENT DOCUMENTS

2004/0181800 A1* 9/2004 Rakib ................... H04L 9/0894
725/100
2007/0022447 A1* 1/2007 Arseneau ............... H04H 60/15
725/38
(Continued)

FOREIGN PATENT DOCUMENTS

CN 102047338 A 5/2011
CN 107105096 A 8/2017
(Continued)

OTHER PUBLICATIONS

International Search Report, CNIPA International Search Authority, dated Jan. 29, 2021, from PCT/CN2020/101157 filed Jul. 9, 2020.

*Primary Examiner* — Tan Doan
(74) *Attorney, Agent, or Firm* — ANOVA LAW GROUP, PLLC

(57) ABSTRACT

A method for playing a streaming media file and a display apparatus are provided. The method includes: receiving a command for replaying at least one portion of a streaming media file that has been played from a user; determining a first timestamp associating with replaying of the at least one portion of the streaming media file that has been played; calculating audio data capacity between the first timestamp and a second timestamp corresponding to a current play time point of the streaming media file when the command is received; in response to the audio data capacity being not greater than capacity of a cache space for a browser of a streaming application, sending audio data after the first timestamp in the cache space directly to a decoder for decoding without sending the audio data to a decryption module for decryption; outputting audio data decoded by the decoder to a loudspeaker.

20 Claims, 5 Drawing Sheets

(51) Int. Cl.
  *H04L 65/65* (2022.01)
  *H04N 21/4405* (2011.01)
  *H04N 21/4627* (2011.01)
  *H04N 21/8547* (2011.01)

(52) U.S. Cl.
  CPC ..... *H04N 21/4405* (2013.01); *H04N 21/4627* (2013.01); *H04N 21/8547* (2013.01)

(58) Field of Classification Search
  CPC ........... H04N 21/8547; H04N 21/4392; H04N 21/431; H04N 21/439; H04N 21/8456
  USPC ....................................................... 709/231
  See application file for complete search history.

(56) References Cited

U.S. PATENT DOCUMENTS

| | | | | |
|---|---|---|---|---|
| 2007/0033419 | A1* | 2/2007 | Kocher | G11B 20/00884 713/193 |
| 2014/0037090 | A1* | 2/2014 | Nicholls | H04N 21/4405 380/201 |
| 2014/0095890 | A1* | 4/2014 | Mangalore | G06F 21/60 713/189 |
| 2017/0188092 | A1 | 6/2017 | Lawrence | |

FOREIGN PATENT DOCUMENTS

| | | | |
|---|---|---|---|
| CN | 105100172 B | * | 3/2018 |
| CN | 107979570 A | | 5/2018 |
| WO | 2016150350 | | 9/2016 |

\* cited by examiner

METHOD FOR PLAYING STREAMING MEDIA FILE AND DISPLAY APPARATUS

CROSS REFERENCE TO RELATED APPLICATIONS

This application is a continuation application of International Application No. PCT/CN2020/101157, filed on Jul. 9, 2020, which claims priority to Chinese Patent Application No. CN 202010424713.6, filed on May 19, 2020 and entitled "Method for Playing Streaming Media File and Display Apparatus", which is hereby incorporated by reference in its entirety.

FIELD

The disclosure relates to streaming media technology, and particularly to a method for playing a streaming media file and a display apparatus.

BACKGROUND

As various smart devices and good network conditions are available, various streaming media applications have emerged in the market, for example, Youtube, Google Play Movies and other streaming media applications. Compared with a computer or smartphone, the experience of watching streaming media files on a smart television is better, especially for paid streaming media files with higher quality. Users prefer to watch on the smart television with a larger screen and clearer display.

When a user watches an encrypted streaming media file on the smart television, if the user wants to watch the streaming media file he or she has seen previously, the streaming media file may be replayed via fast backward, but only displaying a playing interface on the display with no sound often occurs.

SUMMARY

The disclosure provides a method for playing a streaming media file and a display apparatus.

A display apparatus is provided, including: a display configured to present an image; at least one loudspeaker configured to output audio; a user input interface configured to receive a command from a user; a network module configured to connect with Internet and obtain a streaming media file from a server via Internet; a decryption module configured to decrypt data for the media file with DRM information; a decoder configured to decode data for the media file after the decryption module; a controller in connection with the display, the at least one loudspeaker, the user input interface, the network module, the decryption module and decoder and configured to: while a streaming media file from a streaming application is being played on the display of the display apparatus, receive a command for replaying at least one portion of the streaming media file that has been played from a user via the user input interface, wherein the streaming media file includes audio data and video data, the audio data is decrypted in the decryption module and at least one portion of the audio stream is cached in a cache space for a browser of the streaming application; determine a first timestamp associating with replaying of the at least one portion of the streaming media file that has been played; calculate audio data capacity between the first timestamp and a second timestamp corresponding to a current play time point of the streaming media file when the command is received; in response to the audio data capacity being not greater than capacity of the cache space for the browser of the streaming application, send audio data after the first timestamp in the cache space directly to the decoder for decoding without sending the audio data to the decryption module for decryption; output audio data decoded by the decoder to the loudspeaker.

In some embodiments, the controller is further configured to: send audio data after the second timestamp in the cache space to the decryption module for decryption; send audio data decrypted by the decryption module to the decoder for decoding; output audio data decoded by the decoder to the loudspeaker.

In some embodiments, the controller is further configured to: determine whether the audio data is in an encrypted state according to encrypted identification information included in the streaming media file.

In some embodiments, the encrypted identification information includes DRMinfo.

In some embodiments, the controller is further configured to: in response to the audio data capacity being greater than capacity of the cache space for the browser of the streaming application, send a request for obtaining a streaming media file corresponding to the replaying of the at least one portion of the media file to the server via the network module.

In some embodiments, the controller is further configured to: cause the video data to be decrypted in Trusted Execution Environment and different from decryption of the audio data.

In some embodiments, the decryption module is configured in a middleware layer of the display apparatus.

In some embodiments, the decoder is configured in a chip of the display apparatus.

In some embodiments, the streaming media file includes a plurality of data packets.

In some embodiments, the first timestamp and second timestamp are extracted from the plurality of data packets.

A method for playing a streaming media file on a display apparatus is provided, including: while a streaming media file from a streaming application is being played on a display of the display apparatus, receiving a command for replaying at least one portion of the streaming media file that has been played from a user via a user input interface of the display apparatus, wherein the streaming media file includes audio data and video data, the audio data is decrypted in a decryption module of the display apparatus and at least one portion of the audio stream is cached in a cache space for a browser of the streaming application in the display apparatus; determining a first timestamp associating with replaying of the at least one portion of the streaming media file that has been played; calculating audio data capacity between the first timestamp and a second timestamp corresponding to a current play time point of the streaming media file when the command is received; in response to the audio data capacity being not greater than capacity of the cache space for the browser of the streaming application, sending audio data after the first timestamp in the cache space directly to a decoder for decoding without sending the audio data to the decryption module for decryption; outputting audio data decoded by the decoder to a loudspeaker.

In some embodiments, the method further includes: sending audio data after the second timestamp in the cache space to the decryption module for decryption; sending audio data decrypted by the decryption module to the decoder for decoding; outputting audio data decoded by the decoder to the loudspeaker.

In some embodiments, the method further includes: determining whether the audio data is in an encrypted state according to encrypted identification information included in the streaming media file.

In some embodiments, the encrypted identification information includes DRMinfo.

In some embodiments, the method further includes: in response to the audio data capacity being greater than capacity of the cache space for the browser of the streaming application, sending a request for obtaining a streaming media file corresponding to the replaying of the at least one portion of the media file to a server via a network module of the display apparatus.

In some embodiments, the method further includes: causing the video data to be decrypted in Trusted Execution Environment in the display apparatus and different from decryption of the audio data.

In some embodiments, the decryption module is configured in a middleware layer of the display apparatus.

In some embodiments, the decoder is configured in a chip of the display apparatus.

In some embodiments, the streaming media file includes a plurality of data packets.

In some embodiments, the first timestamp and second timestamp are extracted from the plurality of data packets.

DETAILED DESCRIPTION OF EMBODIMENTS

In order to make the objects, schemes and advantages of the disclosure clearer, the disclosure will be further illustrated below in details with reference to the accompanying drawings. Obviously the described embodiments are merely some embodiments of the disclosure but not all embodiments. Based upon embodiments of the disclosure, all of other embodiments obtained by those ordinary skilled in the art without creative work pertain to the protection scope of the disclosure.

Figure 1A:
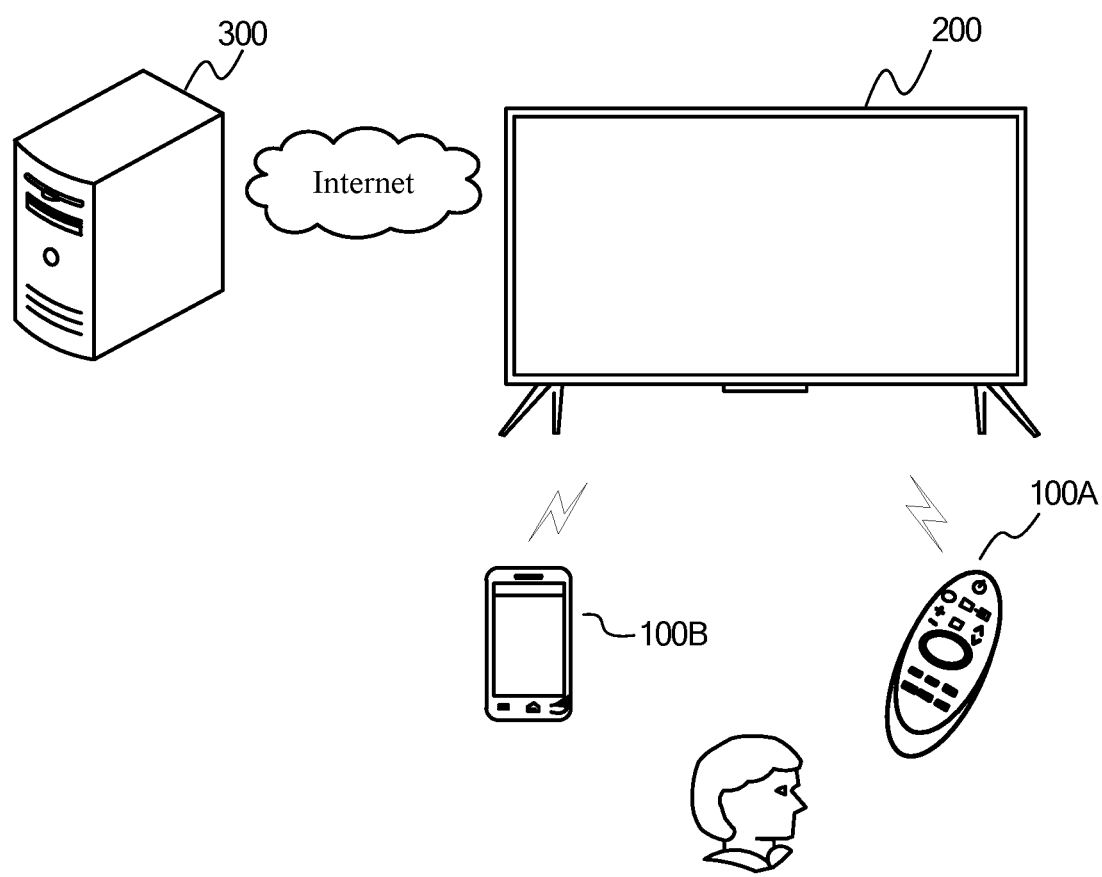
FIG. 1A shows a schematic diagram of an operation scenario between a display apparatus and a control device.

FIG. 1A shows a schematic diagram of an operation scenario between a display apparatus and a control device. As shown in FIG. 1A, communications between the control device 100 and the display apparatus 200 may be performed in a wired or wireless manner.

Here, the control device 100 is configured to control the display apparatus 200, receive an operation command input from a user, and convert the operation command into an instruction that can be recognized and responded by the display apparatus 200, playing an intermediary role between the user and the display apparatus 200. For example, the user operates channel+/−keys on the control device 100, and the display apparatus 200 responds to channel+/−operations.

The control device 100 may be a remote controller 100A, which includes infrared protocol communication or Bluetooth protocol communication and other short-range communication methods, etc., and controls the display apparatus 200 wirelessly or by other wired methods. The user may input user commands through keys on the remote controller, voice inputs, control panel inputs, etc. to control the display apparatus 200. For example, the user may input corresponding control commands through volume+/−keys, channel control keys, up/down/left/right keys, voice input keys, menu key, power key, etc. on the remote controller to control functions of the display apparatus 200.

The control device 100 may also be a smart device, such as a mobile terminal 100B, a tablet computer, a computer, a notebook computer, etc. For example, an application running on the smart device is configured to control the display apparatus 200. This application may be configured to provide the user with various controls through an intuitive User Interface (UI) on the screen associated with the smart device.

For example, the mobile terminal 100B and the display apparatus 200 may install software applications, and implement connection and communication through network communication protocols, achieving the purpose of one-to-one control operation and data communication. For example, the mobile terminal 100B and the display apparatus 200 may be made to establish a control command protocol, and functions of the physical keys arranged in the remote control 100A are realized by operating various function keys or virtual buttons of the user interface provided on the mobile terminal 100B. The audio and video content displayed on the mobile terminal 100B may also be transmitted to the display apparatus 200 to realize the synchronous display function.

The display apparatus 200 may provide a broadcast receiving function and a network TV function supported by the computer. The display apparatus may be implemented as a digital TV, an Internet TV, an Internet Protocol TV (IPTV), etc.

The display apparatus 200 may be a liquid crystal display, an organic light emitting display, or a projection device. The type, size and resolution of the display apparatus are not limited.

The display apparatus 200 also performs data communication with a server 300 through various communication methods. Here, the display apparatus 200 may be allowed to perform communication and connection through a Local Area Network (LAN), a Wireless Local Area Network (WLAN), and other networks. The server 300 may provide various contents and interactions to the display apparatus 200. For example, the display apparatus 200 may send and receive information, for example: receive Electronic Program Guide (EPG) data, receive software updates, or access a remotely stored digital media library. The server 300 provides the video on demand, advertising service and other network service content.

Figure 1B:
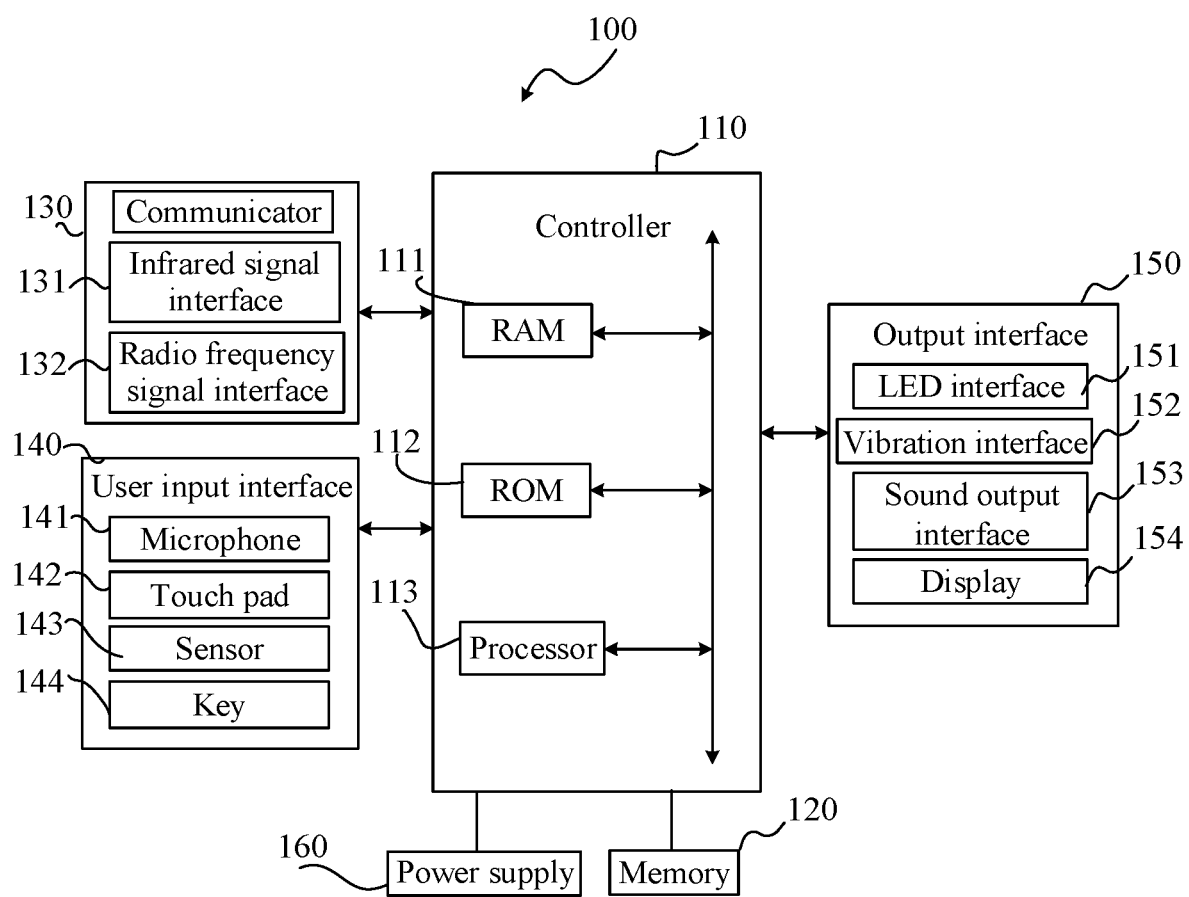
FIG. 1B shows a block diagram of configuration of the control device 100 in FIG. 1A.

FIG. 1B shows a block diagram of configuration of the control device 100. As shown in FIG. 1B, the control device 100 includes a controller 110, a memory 120, a communicator 130, a user input interface 140, an output interface 150, and a power supply 160.

The controller 110 includes a Random Access Memory (RAM) 111, a Read Only Memory (ROM) 112, a processor 113, a communication interface and a communication bus. The controller 110 is configured to control running and operations of the control device 100, and communication cooperation among internal components as well as external and internal data processing functions.

For example, when an interaction of a user pressing a key arranged on the remote controller 100A or an interaction of touching a touch panel arranged on the remote controller 100A is detected, the controller 110 may control to generate a signal corresponding to the detected interaction and send the signal to the display apparatus 200.

The memory 120 is configured to store various operating programs, data and applications that drive and control the control device 100 under control of the controller 110. The memory 120 may store various kinds of control signal commands input from the user.

The communicator 130 realizes communications of control signals and data signals with the display apparatus 200 under the control of the controller 110. For example, the control device 100 sends a control signal (e.g., a touch signal or a button signal) to the display apparatus 200 via the communicator 130, and the control device 100 may receive a signal sent from the display apparatus 200 via the communicator 130. The communicator 130 may include an infrared signal interface 131 and a radio frequency signal interface 132. For example, in the case of infrared signal interface, there is a need to convert a command input from a user into an infrared control signal according to an infrared control protocol and send the infrared control signal to the display apparatus 200 via an infrared sending module. As another example, in the case of radio frequency signal interface, there is a need to convert a command input from a user into a digital signal, modulate the digital signal according to a radio frequency control signal modulation protocol, and then send the modulated digital signal to the display apparatus 200 via a radio frequency sending module.

The user input interface 140 may include at least one of a microphone 141, a touch pad 142, a sensor 143, a key 144, etc., so that the user may input user commands for controlling the display apparatus 200 to the control device 100 through voice, touch, gesture, press, etc.

The output interface 150 outputs user commands received via the user input interface 140 to the display apparatus 200, or outputs images or voice signals received by the display apparatus 200. Here, the output interface 150 may include an LED interface 151, a vibration interface 152 that generates vibration, a sound output interface 153 that outputs sound, and a display 154 that outputs images, etc. For example, the remote control 100A may receive output signals such as audio, video or data from the output interface 150, and display the output signals in the form of images on the display 154, output the signals in the form of audio on the sound output interface 153, or output the signals in the form of vibration on the vibration interface 152.

The power supply 160 is configured to provide power support for all the elements of the control device 100 under the control of the controller 110. The power supply may be in the form of battery and related control circuit.

Figure 1C:
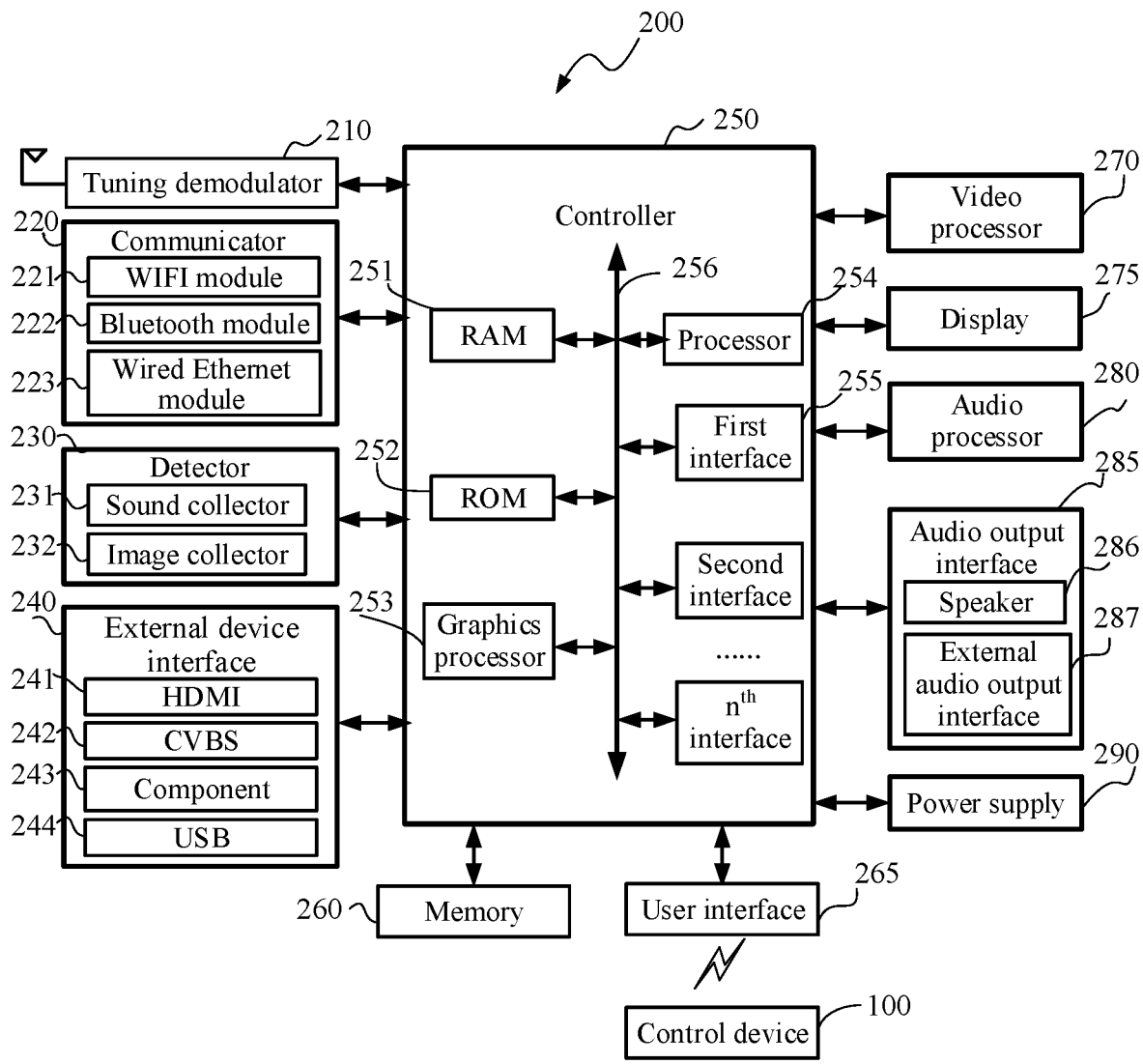
FIG. 1C shows a block diagram of configuration of the display apparatus 200 in FIG. 1A.

FIG. 1C shows a block diagram of a hardware configuration of the display apparatus 200. As shown in FIG. 1C, the display apparatus 200 may include a tuning demodulator 210, a communicator 220, a detector 230, an external device interface 240, a controller 250, a memory 260, a user interface 265, a video processor 270, a display 275, an audio processor 280, an audio output interface 285, and a power supply 290.

The tuning demodulator 210 receives broadcast television signals through wired or wireless methods, and may perform amplification, frequency mixing, resonance and other modulation/demodulation processing, to demodulate audio and video signals carried in the frequency of the television channel selected by the user from a plurality of wireless or wired broadcast television signals, as well as additional information (e.g., EPG data).

The tuning demodulator 210 may respond to the frequency of the television channel selected by the user and the television signal carried by the frequency according to the user's selection under the control of the controller 250.

The tuning demodulator 210 may receive signals in many ways according to different broadcasting formats of television signals, such as: terrestrial broadcasting, cable broadcasting, satellite broadcasting, or Internet broadcasting, etc.; and according to different modulation types, the digital modulation mode or analog modulation mode may be used; and according to different types of received television signals, analog and digital signals may be demodulated.

In some other embodiments, the tuning demodulator 210 may also be in an external device, such as an external set-top box, etc. In this way, the set-top box outputs television signals after modulation and demodulation, and the television signals after modulation and demodulation are input to the display apparatus 200 through the external device interface 240.

The communicator 220 is a component for communicating with an external device or an external server according to various types of communication protocols. For example, the display apparatus 200 may send content data to an external device connected via the communicator 220, or browse and download the content data from an external device connected via the communicator 220. The communicator 220 may include a WIFI module 221, a Bluetooth communication protocol module 222, a wired Ethernet communication protocol module 223, and other network communication protocol modules or near-field communication protocol modules, so that the communicator 220 can receive control signals from the control device 100 under the control of the controller 250 and implement the control signals as WIFI signals, Bluetooth signals, radio frequency signals, etc.

The detector 230 is a component used by the display apparatus 200 to collect signals from the external environment or signals for interacting with the outside. The detector 230 may include a sound collector 231, such as a microphone, which may be configured to receive user's voice, e.g., a user's voice command to control the display apparatus 200; or may collect the environment sound for identifying the environment scene type, so that the display apparatus 200 can adapt to the environment noise accordingly.

In some other embodiments, the detector 230 may further include an image collector 232, such as a camera, a webcam, etc., which may be configured to collect the external environment scene to adaptively change display parameters of the display apparatus 200, and collect the user's attributes or user's interaction gestures to realize the function of interaction between the display apparatus and the user.

In some other embodiments, the detector 230 may further include a light receiver configured to collect the ambient light intensity to adapt to changes in display parameters of the display apparatus 200, etc.

In other some embodiments, the detector 230 may further include a temperature sensor. For example, by sensing the ambient temperature, the display apparatus 200 may adaptively adjust the display color temperature of the image. For example, when the environment has a high temperature, the color temperature of the image displayed by the display apparatus 200 may be adjusted to the cold color tone; when the environment has a low temperature, the image shown by the display apparatus 200 may be adjusted to warm color tone.

The external device interface 240 is a component that provides the controller 250 to control data transmission between the display apparatus 200 and external devices. The external device interface 240 may be connected with external devices such as a set-top box, a game device, a laptop, etc. in a wired/wireless manner, and may receive data such as video signals (e.g., moving images), audio signals (e.g., music), additional information (e.g., EPG), etc. of the external devices.

Here, the external device interface 240 may include: any one or more of a High-Definition Multimedia Interface (HDMI) 241, a Composite Video Blanking Synchronization (CVBS) interface 242, an analog or digital component interface 243, a Universal Serial Bus (USB) interface 244, a Component terminal (not shown in the figure), a Red-Green-Blue (RGB) interface (not shown in the figure), etc.

The controller 250 controls operations of the display apparatus 200 and responds to the user's operations by running various software control programs (such as operating system and various applications) stored on the memory 260. For example, the controller may be implemented as a System-on-a-Chip (SOC).

As shown in FIG. 1C, the controller 250 includes a Random Access Memory (RAM) 251, a Read Only Memory (ROM) 252, a graphics processor 253, a CPU processor 254, a communication interface 255, and a communication bus 256. The RAM 251, the ROM 252, the graphics processor 253, the CPU processor 254 and the communication interface 255 are connected through the communication bus 256.

The graphics processor 253 is configured to generate various graphics objects, such as icons, operation menus, display graphics for user input commands, etc. The graphics processor 253 may include: an arithmetic unit configured to perform operations by receiving various commands input from users and then display various objects according to display attributes; and a renderer configured to generate a result of rendering various objects obtained based on the arithmetic unit and display the result on the display 275.

In some embodiments, the CPU processor 254 may include a plurality of processors. The plurality of processors may include a main processor and one or more sub-processors. The main processor is configured to perform some initialization operations of the display apparatus 200 in a preloading mode of the display apparatus, and/or the operation of displaying a picture in a normal mode. One or more sub-processors are configured to perform an operation in a standby mode or other states of the display apparatus.

The communication interface 255 may include a first interface to an $n^{th}$ interface. These interfaces may be network interfaces connected to external devices via a network.

The controller 250 may control the overall operation of the display apparatus 200. For example, in response to receiving a user input command for selecting a GUI object displayed on the display 275, the controller 250 may perform operations related to the object selected by the user input command. For example, the controller may be implemented as an SOC (System on Chip) or an MCU (Micro Control Unit).

Here, the object may be any one of selectable objects, e.g., a hyperlink or an icon. Operations related to the selected object include, for example, the operation of displaying the connection to a hyperlink page, document, image or the like, or the operation of running an application corresponding to the icon. The user input command for selecting the GUI object may be a command input through various input devices (for example, a mouse, a keyboard, a touch pad, etc.) connected with the display apparatus 200 or a voice command corresponding to the voice uttered by the user.

The memory 260 is configured to store various types of data, software programs or applications that drive and control operations of the display apparatus 200. The memory 260 may include a transitory and/or non-transitory memory. The term "memory" includes the memory 260, the RAM 251 and ROM 252 of the controller 250, or a memory card in the display apparatus 200.

In some embodiments, the memory 260 is configured to store programs for driving the controller 250 in the display apparatus 200, store various applications built in the display apparatus 200 and downloaded by the user from external devices, and store data for configuring various GUIs provided by the display 275, various GUI-related objects, and visual effect images of a selector for selecting GUI objects.

In some embodiments, the memory 260 is configured to drive programs and related data of the tuning demodulator 210, communicator 220, detector 230, external device interface 240, video processor 270, display 275 and audio processor 280, etc., for example, external data (such as audio and video data) received from the external device interface or user data (such as key information, voice information, touch information, etc.) received from the user interface.

In some embodiments, the memory 260 stores software and/or programs for representing the Operating System (OS). The software and/or programs may include, for example, kernel, middleware, Application Programming Interface (API), and/or applications. For example, the kernel may control or manage system resources or functions implemented by other programs (such as the middleware, API or applications); and at the same time, the kernel may provide interfaces to allow the middleware, API or applications to access the controller, to control or manage the system resources.

Figure 1D:
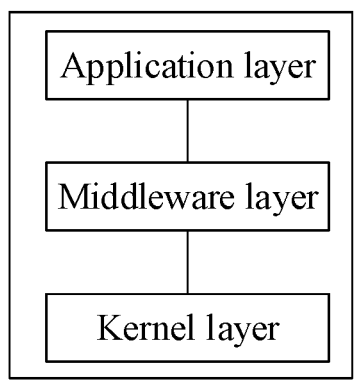
FIG. 1D shows a block diagram of architecture configuration of an operating system in a memory of the display apparatus 200.

FIG. 1D shows a block diagram of architecture configuration of the operating system in the memory of the display apparatus 200. The architecture of the operating system is an application layer, a middleware layer and a kernel layer from top to bottom.

Regarding the application layer, the applications built in the system and the non-system-level applications are in the application layer. The application layer is responsible for direct interaction with users. The application layer may include a plurality of applications, such as a settings application, an electronic post application, a media center application, etc. These applications may be implemented as Web applications, which are executed based on the WebKit engine, and in particular may be developed and executed based on HTML5, Cascading Style Sheets (CSS) and JavaScript.

The middleware layer may provide some standardized interfaces to support operations of various environments and systems. For example, the middleware layer may be implemented as Multimedia and Hypermedia Information Coding Expert Group (MHEG) for data broadcast-related middleware, or may be implemented as DLNA middleware for external device communication-related middleware, or may be implemented as a middleware providing the browser environment in which each application in the display apparatus runs, etc.

The kernel layer provides core system services, for example, file management, memory management, process management, network management, system security authority management, and other services. The kernel layer may be implemented as a kernel based on various operating systems, for example, a kernel based on a Linux operating system.

The kernel layer also provides communication between system software and hardware, and provides device drive services for various hardware, for example: provides a drive program for the panel, provides a camera drive program for the camera, provides a button drive program for the remote control, provides a WiFi drive program for the WIFI module, provides an audio drive program for the audio output interface, provides a power management drive for the Power Management (PM) module, etc.

The user interface 265 receives various user interactions. The user interface 265 is configured to send the user's input signal to the controller 250 or transmit the output signal from the controller 250 to the user. For example, the remote control 100A may send input signals such as power signal, channel selection signal, volume adjustment signal, etc. input from the user to the user interface 265, and then the user interface 265 forwards the input signals to the controller 250; or the remote control 100A may receive output signals such as audio, video or data processed by the controller 250 and output from the user interface 265, and display the output signals received or output the signals received in the form of audio or vibration.

In some embodiments, the user may input a user command on the Graphical User Interface (GUI) presented on the display 275, and then the user interface 265 receives the user input command through the GUI. The user interface 265 may receive the user input command for controlling a position of a selector in the GUI to select different objects or items.

Alternatively, the user may input a user command by inputting particular sound or gesture, and then the user interface 265 recognizes the sound or gesture through a sensor to receive the user input command.

The video processor 270 is configured to receive an external video signal and perform video data processing such as decompression, decoding, scaling, noise reduction, frame rate conversion, resolution conversion, and image synthesis according to a standard codec protocol of an input signal, to obtain the video signal that can be displayed or played directly on the display 275.

For example, the video processor 270 includes a de-multiplexing module, a video decoding module, an image synthesis module, a frame rate conversion module, a display formatting module, etc.

Here, the de-multiplexing module is configured to de-multiplex input audio and video data stream, e.g., input MPEG-2 stream (based on a compression standard of digital storage media moving image and voice), and then the de-multiplexing module de-multiplexes the input audio and video data stream into a video signal and an audio signal, etc.

The video decoding module is configured to process the de-multiplexed video signal, including decoding and scaling, etc.

The image synthesis module, such as image synthesizer, is configured to superimpose and mix the GUI signal generated by a graphics generator according to the user input or by itself with the scaled video image, to generate an image signal for display.

The frame rate conversion module is configured to convert a frame rate of an input video, for example, convert the frame rate of the input video of 60 Hz into the frame rate of 120 Hz or 240 Hz, where the usual format is implemented by interpolating frames.

The display formatting module is configured to change a signal output by the frame rate conversion module into a signal conforming to such as the display format of the display, e.g., perform the format conversion on the signal output from the frame rate conversion module to output a RGB data signal.

The display 275 is configured to receive image signals input from the video processor 270, and display the video content, images and the menu control interface. The displayed video content may be the video content from the broadcast signal received by the tuning demodulator 210, or may be the video content input from the communicator 220 or external device interface 240. The display 275 also displays the user control interface (UI) generated in the display apparatus 200 for controlling the display apparatus 200.

Also, the display 275 may include a panel component for presenting pictures and a drive component that drives the image display. Alternatively, if the display 275 is a projection display, the display 275 may further include a projection apparatus and a projection screen.

The audio processor 280 is configured to receive an external audio signal, and perform audio data processing such as decompression, decoding, noise reduction, digital-to-analog conversion and amplification according to the standard codec protocol of the input signal, to obtain an audio signal that can be played by the speaker 286.

For example, the audio processor 280 may support various audio formats, for example, MPEG-2, MPEG-4, Advanced Audio Coding (AAC), High Efficiency AAC (HE-AAC) and other formats.

The audio output interface 285 is configured to receive the audio signal output from the audio processor 280 under the control of the controller 250, and the audio output interface 285 may include a speaker 286, or an external audio output interface 287 which outputs the audio signal to a sound generating device of an external device, such as a headphone output terminal.

In some embodiments, the video processor 270 may include one or more chips. The audio processor 280 may also include one or more chips.

And, in some embodiments, the video processor 270 and the audio processor 280 may be separate chips, or may be integrated into one or more chips together with the controller 250.

The power supply 290 is configured to provide the power support for the display apparatus 200 through the power input from an external power supply under the control of the controller 250. The power supply 290 may be a built-in power supply circuit installed inside the display apparatus 200, or may be a power supply installed outside the display apparatus 200.

When a user watches a paid streaming media file on a streaming application or web application in the display apparatus, the user often wants to watch the already played streaming media file repeatedly in the fast backward mode, but the case of only displaying the playing interface corresponding to the streaming media file on the display with no sound may occurs. In some embodiments, the streaming application or web application is based on a browser built in the display apparatus. The communication between a streaming application and its server is based on browser techniques. The data processing at the display apparatus side is done according to browser data processing mechanism.

It is noted that the reason for the above case of only displaying the playing interface with no sound is that the cache mechanism of the browser is not being considered and the audio stream is repeatedly decrypted during the decryption process of the audio stream. The web application is developed based on the browser. For example, the browser may be a Cobalt browser, and the browser itself has the standard EME (Encrypted Media Extensions) for supporting the playing of the copyrighted streaming media files.

Figure 4:
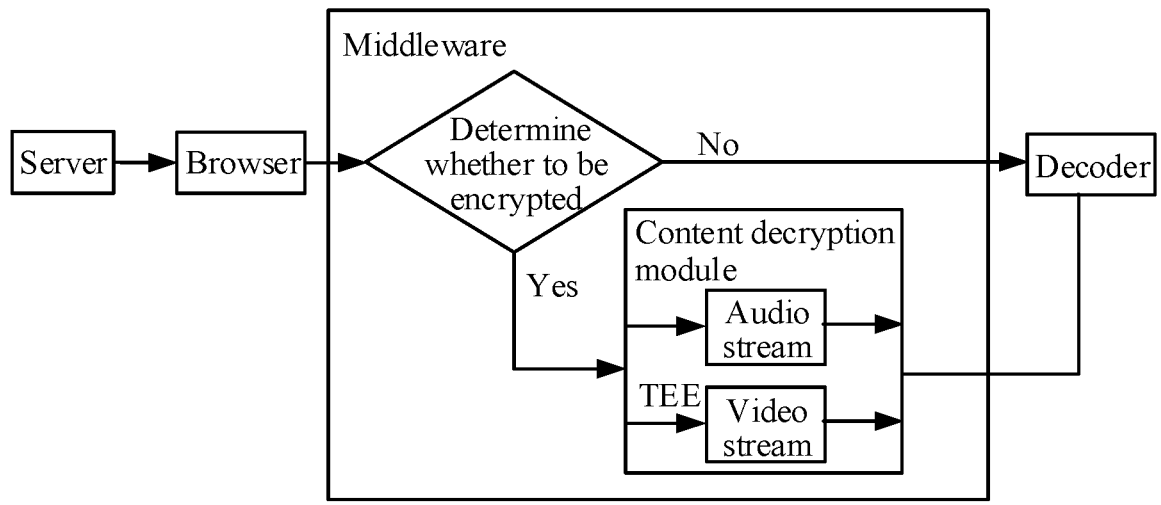
FIG. 4 shows a flow chart of a processing procedure of streaming media file data.

As shown in FIG. 4, when a streaming media file is played, a data processing process of the streaming media file includes: the browser sends a request for streaming media file to a server, and the server sends a streaming media file corresponding to the request to the browser. When obtaining the streaming media file, the browser firstly stores the streaming media file in the cache, where the streaming media file includes a video stream and an audio stream, the video stream is video data, and the audio stream is audio data. The video stream and the audio stream are respectively stored in the browser cache. Then the video stream and the audio stream are processed through middleware.

In some embodiment, the media file is DRM (Digital Rights Management) protected media file. DRM protected media file has an identifier for indicating that the media file is copyright protected, for example, DrmInfo. The middleware firstly determines whether the audio stream is encrypted. If the audio stream includes encrypted identification information, like DrmInfo, then the audio stream is encrypted when DrmInfo is true. If encrypted, the audio stream is sent to the content decryption module for decryption in the middleware, and sent to the decoder for decoding and playing after decryption. As discussed before, the middleware layer may provide some standardized interfaces to support operations of various environments and systems. For example, the middleware may be implemented as a middleware providing the browser environment in which each application in the display apparatus runs. The streaming application or web application in the display apparatus is usually based on a browser and needs middleware to provide browser environment.

It should be noted that a part of the audio stream that has been played may be stored in the cache due to the cache mechanism of the browser, but the audio stream stored in the cache is rewritten to the decrypted audio stream (i.e., clear stream) during the decryption process. Therefore, when replayed in the fast backward mode, the decrypted audio stream is still regarded as the encrypted audio stream (i.e., protected stream), and is decrypted by middleware, resulting in data error, and thus the audio stream cannot be played normally.

Furthermore, since the web application has a higher security requirement on the video stream in the streaming media file, the decryption process is performed in the more secure TEE (Trusted Execution Environment), so the decrypted video stream is not be stored in the cache, that is, the video stream stored in the cache will not be rewritten by the decrypted video stream. Therefore, when replayed in the fast backward mode, the video stream stored in the cache is decrypted, which will not cause data error, and thus the video stream can be played normally. The above cache mechanism of the browser results in the problem that only the playing interface is displayed with no sound when the streaming media file is replayed in the fast backward mode.

Figure 2:
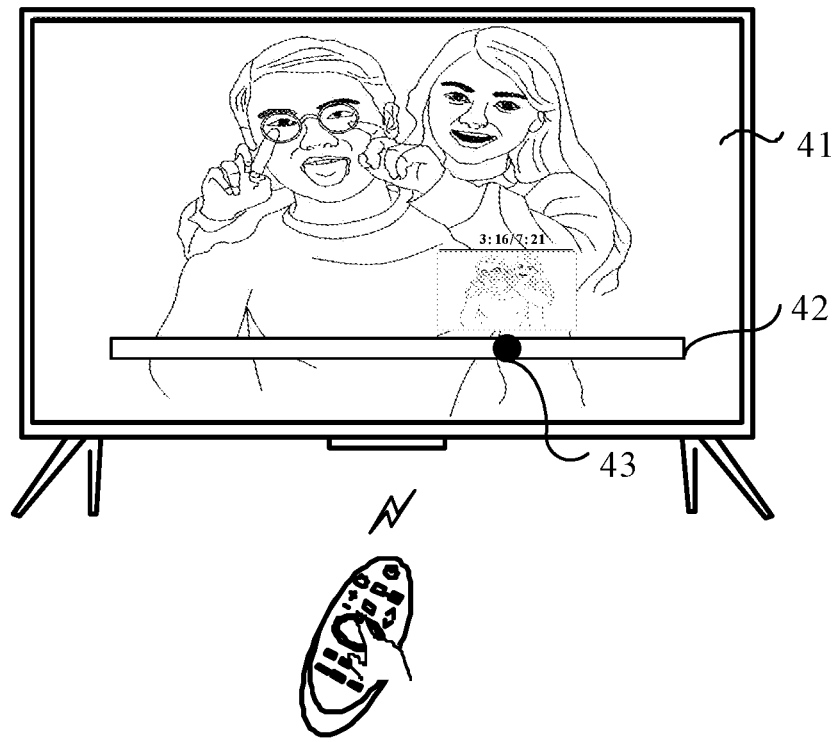
FIG. 2 shows a schematic diagram of a GUI provided by the display apparatus 200.
Figure 3:
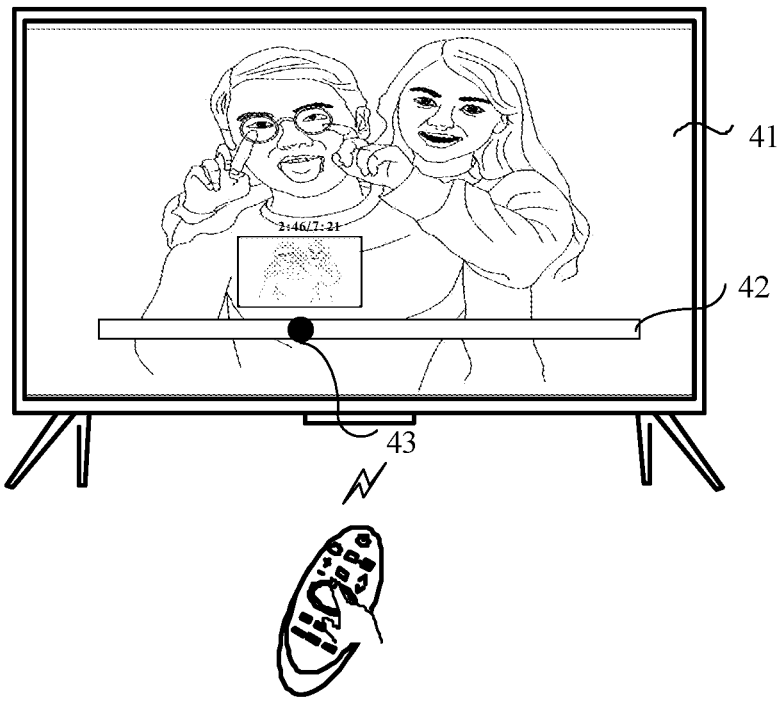
FIG. 3 shows a schematic diagram of another GUI provided by the display apparatus 200.

FIGS. 2-3 show schematic diagrams of a GUI provided by the display apparatus 200.

As shown in FIG. 2, the display apparatus may provide a GUI 400 to the display. The GUI 400 includes a playing interface 41 for a streaming media file, a progress bar 42 for displaying a playing progress of the streaming media file, and a selector 43 for selecting a first timestamp of playing the streaming media file.

For example, as shown in FIG. 2, the streaming media file has been played to 3 minutes and 16 seconds. If the user wants to watch the streaming media file before 3 minutes and 16 seconds, the streaming media file may be replayed in the fast backward mode. The selector on a progress bar may be moved to 2 minutes and 46 seconds, as shown in FIG. 3, so that the streaming media file may be played from 2 minutes and 46 seconds, but only the playing interface is presented on the display with no sound, resulting in poor user experience.

On the basis of FIG. 2, a position of the selector 43 is moved, and the interface is displayed as shown in FIG. 3. The playing interface 41 shown on the display starts to play from the video stream corresponding to the position of the progress bar where the selector 43 is currently located, and simultaneously the loudspeaker starts to play from the audio stream corresponding to the position of the progress bar where the selector 43 is currently located. This kind of progress adjustment is desirable for the user.

Figure 5:
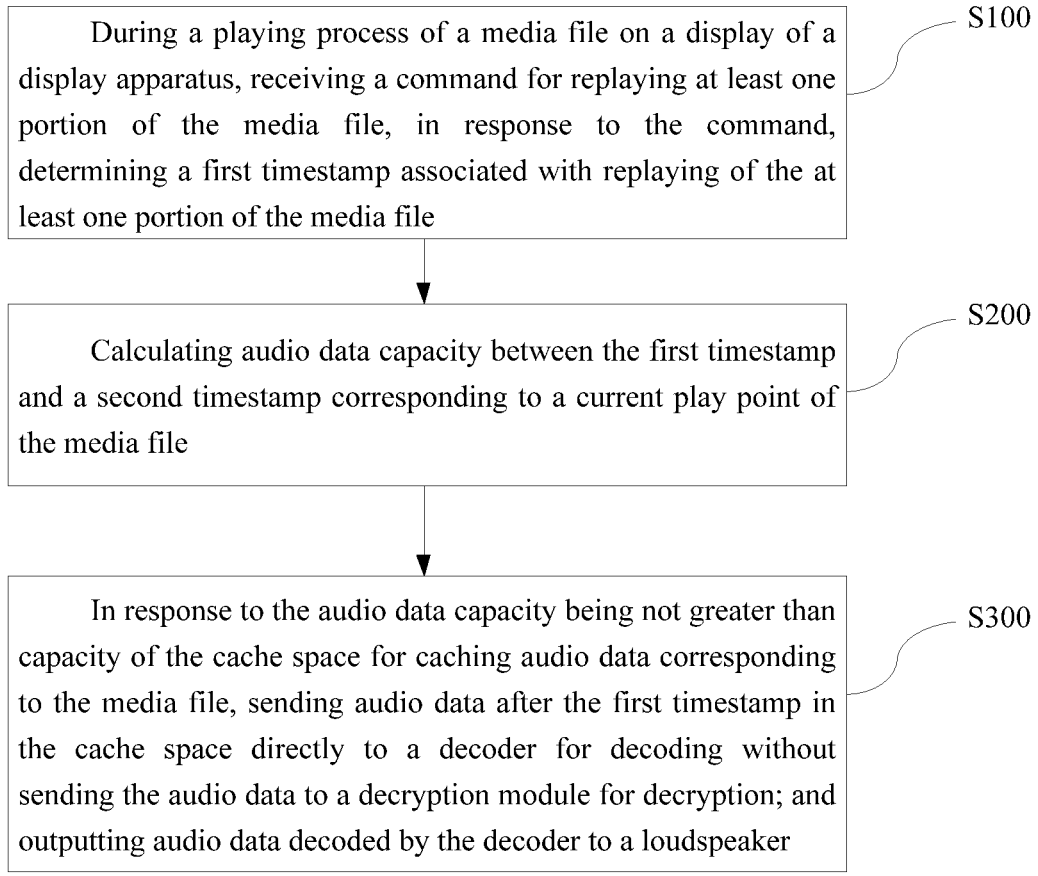
FIG. 5 shows a flow chart of a method for playing a streaming media file.

The disclosure provides a method for playing a streaming media file, as shown in FIG. 5, which includes following steps.

S100: during a playing process of a media file on a display of a display apparatus, receiving a command for replaying at least one portion of the media file, in response to the command, determining a first timestamp associated with replaying of the at least one portion of the media file.

A user may select a streaming media file to be watched through a webpage application developed based on the browser. For example, the streaming media file is an episode of a TV series or a movie. In the process of playing the streaming media file on the display, the user may control the selector to move to a desirable time point on the progress bar where a user wants to re-watch through a key like the "left direction key" or "backward key" on the control device. A command for replaying a portion of the media file that has been played can be input to the display apparatus via an operation of a key on the control device or user's voice command. The command for replaying at least one portion of the media file is configured to instruct to replay a portion of the media file starting from the first timestamp. Furthermore, neither 3 minutes and 16 seconds in FIG. 2 nor 2 minutes and 46 seconds in FIG. 3 is timestamp. Both of the 3 minutes and 16 seconds in FIG. 2 and 2 minutes and 46 seconds in FIG. 3 are time identifiers displayed on the interface to remind the user of the playing positions. For example, when 3 minutes and 16 seconds is displayed on the interface, the timestamp of the streaming media file played at this time may be 3 minutes, 16 seconds and 25 milliseconds.

It should be noted that the streaming media file includes an audio stream and a video stream, the streaming media file includes a series of packets of data sent from the server, and each packet of data includes a timestamp. After the browser receives the streaming media file, whether the streaming media file is DRM protected is determined, for example, the determination can be performed by checking whether DrmInfo is true. If it is determined that the streaming media file is DRM protected, the audio stream is sent to a decryption module in the middleware layer to do decryption before sending a decoder for decoding, for example hardware decoder configured in the chip of the display apparatus. The audio steam after decryption is cached in a cache of the browser for the streaming application. However, the video stream is decoded in a manner different from that of the audio stream, for example, the video stream is decoded in a similar decryption module in the middleware and cached in a cache space of the browser, and then sent to the decoder for decoding. In some embodiments, for the video stream, the decryption process is performed in the more secure TEE (Trusted Execution Environment), so the decrypted video stream is not be stored in the cache, that is, the video stream stored in the cache will not be rewritten by the decrypted video stream in a replay scenario.

Furthermore, the space occupied by the audio stream and the video stream in each packet of data may also be known. In an embodiment of the disclosure, a part of the audio stream that has been played may be stored in the cache due to the cache mechanism of the browser, but the audio stream stored in the cache is rewritten to the decrypted audio stream (i.e., clear stream) during the decryption process. Therefore, in an embodiment of the disclosure, it is determined whether the audio stream that needs to be replayed is in the cache according to the cache space. If it is in the cache, the audio stream is directly sent to the decoder since it has been converted to the clear stream, and the display is controlled to play the decrypted audio stream after being decoded by the decoder, where the decoder is configured in a chip of the display apparatus.

Furthermore, the cache in the browser has a fixed storage space, so the latest content stored in the cache replaces the original content when the capacity of the content stored in the cache is greater than the fixed storage space of the cache. The principle of replacement is in chronological order, where the content in the cache which is placed in the cache first is replaced.

S200: calculating audio data capacity between the first timestamp and a second timestamp corresponding to a current play point of the media file. As discussed above, during the playing process of the media file, the progress bar of the media file presents a current time-point of the video, like 2 minutes and 46 seconds in FIG. 3. The second timestamp is a more accurate time point of the time point identifier presented on the progress bar.

S300: in response to the audio data capacity being not greater than capacity of the cache space for caching audio data corresponding to the media file, sending audio data after the first timestamp in the cache space directly to a decoder for decoding without sending the audio data to a decryption module for decryption; and outputting audio data decoded by the decoder to a loudspeaker.

For example, there may be a plurality of data packets between the first timestamp and the second timestamp, the audio data capacity between the first timestamp and the second timestamp is determined to be 9.6M, and the capacity of the cache space is 10M.

In an embodiment of the disclosure, if the audio data capacity is not greater than the capacity of the cache space for caching the audio data corresponding to the media file, it means that the replayed audio stream is also stored in the cache in the form of clear stream, so the audio stream after the first timestamp in the cache space is directly decoded by sending to the decoder directly.

The method further includes: sending audio data after the second timestamp in the cache space to the decryption module for decryption; sending audio data decrypted by the decryption module to the decoder for decoding; outputting audio data decoded by the decoder to the loudspeaker.

In an embodiment of the disclosure, if the audio data capacity is not greater than the capacity of the cache space for caching the audio data corresponding to the media file, it is played directly according to the clear stream, that is, directly decoded and played. When the played audio stream is not in the cache, the middleware is used again to decrypt the audio stream, and the decoder is configured to decode and play after decryption.

An embodiment of the disclosure further provides a method for playing a streaming media file, including: during a play process of the media file on a display of the display apparatus, receiving a command for replaying a portion of the media file that has been played, determining a first timestamp associating with replaying of the portion of the media file, where the media file includes video stream and audio stream, the media file is DRM protected media file and encrypted, the audio stream of the media file is decrypted in decryption module in the middleware of the display apparatus and then decoded in a decoder of the display apparatus, stored in a cache space of a browser in the display apparatus, the video stream of the media file is decoded in a Trusted Execution Environment and in a manner different from that of the audio stream; calculating audio data capacity between the first timestamp and a second timestamp corresponding to a current play time-point presented on the progress bar of the media file; sending audio data after the first timestamp newly cached in the cache space for caching audio data corresponding to the media file to a decryption module for decryption when it is determined that the audio data capacity is greater than capacity of the cache space, where the audio data newly cached in the cache space is the audio data cached after the current play time point before the command for replay; sending audio data decrypted by the decryption module to a decoder for decoding; and outputting audio data decoded by the decoder to a loudspeaker.

Due to the limited cache space, if the audio data capacity is greater than the capacity of the cache space for caching the audio data corresponding to the media file, it means that the audio stream that needs to be played is no longer stored in the cache, and there is a need at this time to re-send the audio stream request to the server for obtaining the audio stream in the replay period.

Embodiments of the disclosure allows for using the browser cache to improve the data processing efficiency, and also ensure that the problem of no sound in replay scenario will not occur. In addition, there is no need to rely on a specific chip platform or browser, and the compatible ability is better.

As described in the above embodiments, a method for playing a streaming media file and a display apparatus enable the display apparatus to replay the streaming media file without the phenomenon of only the playing interface and no sound.

Although embodiments of the disclosure have been described, those skilled in the art can make additional alterations and modifications to these embodiments once they learn about the basic creative concepts. Thus the attached claims are intended to cover these embodiments as well as all the modifications.

What is claimed is:

1. A method for playing a streaming media file on a display apparatus, comprising:
    having a streaming media file from a streaming application being played on a display of the display apparatus, wherein
        the streaming media file comprises audio data and video data, both being Processed by the decryption module and the decoder, the audio data after decryption is at least partially cached in a cache space for a browser of the streaming application and the video data after decryption is not cached;

receiving a command for replaying at least one portion of the streaming media file that has been played from a user via a user input interface of the display apparatus;

determining a first timestamp associating with replaying of the at least one portion of the streaming media file that has been played;

calculating audio data capacity between the first timestamp and a second timestamp corresponding to a current play time point of the streaming media file when the command is received;

in response to the audio data capacity being not greater than capacity of the cache space for the browser of the streaming application, sending first audio data after the first timestamp in the cache space directly to a decoder for decoding without sending the first audio data to the decryption module for decryption; and send first video data, corresponding to the first audio data, to the decryption module for decryption and further to the decoder for decoding;

outputting the first audio data after decoding without decryption to a loudspeaker, and outputting the first video data after decryption and decoding.

2. The method according to claim 1, wherein the method further comprises:

sending audio data after the second timestamp in the cache space to the decryption module for decryption;

sending audio data decrypted by the decryption module to the decoder for decoding;

outputting audio data decoded by the decoder to the loudspeaker.

3. The method according to claim 1, wherein the method further comprises:

determining whether the audio data is in an encrypted state according to encrypted identification information comprised in the streaming media file.

4. The method according to claim 3, wherein the encrypted identification information comprises DRMinfo.

5. The method according to claim 1, wherein the method further comprises:

in response to the audio data capacity being greater than capacity of the cache space for the browser of the streaming application, sending a request for obtaining a streaming media file corresponding to the replaying of the at least one portion of the media file to a server via a network module of the display apparatus.

6. The method according to claim 1, wherein the method further comprises:

causing the video data to be decrypted in Trusted Execution Environment of the display apparatus and different from decryption of the audio data.

7. The method according to claim 1, wherein the decryption module is configured in a middleware layer of the display apparatus.

8. The method according to claim 1, wherein the decoder is configured in a chip of the display apparatus.

9. The method according to claim 1, wherein the streaming media file comprises a plurality of data packets.

10. The method according to claim 9, wherein the first timestamp and second timestamp are extracted from the plurality of data packets.

11. A display apparatus, comprising:
a display configured to present an image;
at least one loudspeaker configured to output audio;
a user input interface configured to receive a command from a user;
a network module configured to connect with Internet and obtain a streaming media file from a server via Internet;
a decryption module configured to decrypt data for the media file with ©RM information;
a decoder configured to decode data for the media file after the decryption module;
a controller in connection with the display, the at least one loudspeaker, the user input interface, the network module, the decryption module and decoder and configured to:

have a streaming media file from a streaming application being played on the display of the display apparatus, wherein the streaming media file comprises audio data and video data, both being processed by the decryption module and the decoder, the audio data after decryption is at least partially cached in a cache space for a browser of the streaming application and the video data after decryption is not cached;

receive a command for replaying at least one portion of the streaming media file that has been played from a user via the user input interface;

determine a first timestamp associating with replaying of the at least one portion of the streaming media file that has been played;

calculate audio data capacity between the first timestamp and a second timestamp corresponding to a current play time point of the streaming media file when the command is received;

in response to the audio data capacity being not greater than capacity of the cache space for the browser of the streaming application, send first audio data after the first timestamp in the cache space directly to the decoder for decoding without sending the first audio data to the decryption module for decryption; and send first video data, corresponding to the first audio data, to the decryption module for decryption and further to the decoder for decoding;

output the first audio data after decoding without decryption to the loudspeaker, and output the first video data after decryption and decoding.

12. The display apparatus according to claim 11, wherein the controller is further configured to:

send audio data after the second timestamp in the cache space to the decryption module for decryption;

send audio data decrypted by the decryption module to the decoder for decoding;

output audio data decoded by the decoder to the loudspeaker.

13. The display apparatus according to claim 11, wherein the controller is further configured to:

determine whether the audio data is in an encrypted state according to encrypted identification information comprised in the streaming media file.

14. The display apparatus according to claim 13, wherein the encrypted identification information comprises DRMinfo.

15. The display apparatus according to claim 11, wherein the controller is further configured to:

in response to the audio data capacity being greater than capacity of the cache space for the browser of the streaming application, send a request for obtaining a streaming media file corresponding to the replaying of the at least one portion of the media file to the server via the network module.

16. The display apparatus according to claim 11, wherein the controller is further configured to:
   cause the video data to be decrypted in Trusted Execution Environment and different from decryption of the audio data.

17. The display apparatus according to claim 11, wherein the decryption module is configured in a middleware layer of the display apparatus.

18. The display apparatus according to claim 11, wherein the decoder is configured in a chip of the display apparatus.

19. The display apparatus according to claim 11, wherein the streaming media file comprises a plurality of data packets.

20. The display apparatus according to claim 19, wherein the first timestamp and second timestamp are extracted from the plurality of data packets.

* * * * *